United States Patent [19]
Anderson

[11] Patent Number: 5,848,470
[45] Date of Patent: Dec. 15, 1998

[54] IMPACT ACTUATED BAKERY GRID DEVICE

[76] Inventor: Melanie Anderson, 14411 Atlantic, Riverdale, Ill. 60827-2716

[21] Appl. No.: 912,352

[22] Filed: Aug. 18, 1997

[51] Int. Cl.[6] .................................................... B26B 3/04
[52] U.S. Cl. .............................................. 30/277; 30/303
[58] Field of Search ............................ 30/303, 305, 114, 30/277

[56] References Cited

U.S. PATENT DOCUMENTS

| | | | |
|---|---|---|---|
| 1,175,512 | 3/1916 | Flemal | 30/303 X |
| 2,485,877 | 10/1949 | Hamilton | 30/277 |
| 4,250,618 | 2/1981 | Custer et al. | 30/114 |
| 4,625,404 | 12/1986 | Valente et al. | 30/114 |
| 5,074,777 | 12/1991 | Garner | 425/289 |
| 5,129,159 | 7/1992 | Fuenzalida | 30/114 |

*Primary Examiner*—Douglas D. Watts
*Attorney, Agent, or Firm*—Henderson & Sturm

[57] ABSTRACT

An impact actuated bakery grid device 10 for producing uniform portions of baked goods wherein the grid device 10 includes a force generating unit 13 operatively associated with a handle member 30 which is connected at widely spaced locations on a grid member 20 for forcibly ejecting the portions of baked goods from within the confines of a plurality of compartments 24 within the grid member 20.

5 Claims, 1 Drawing Sheet

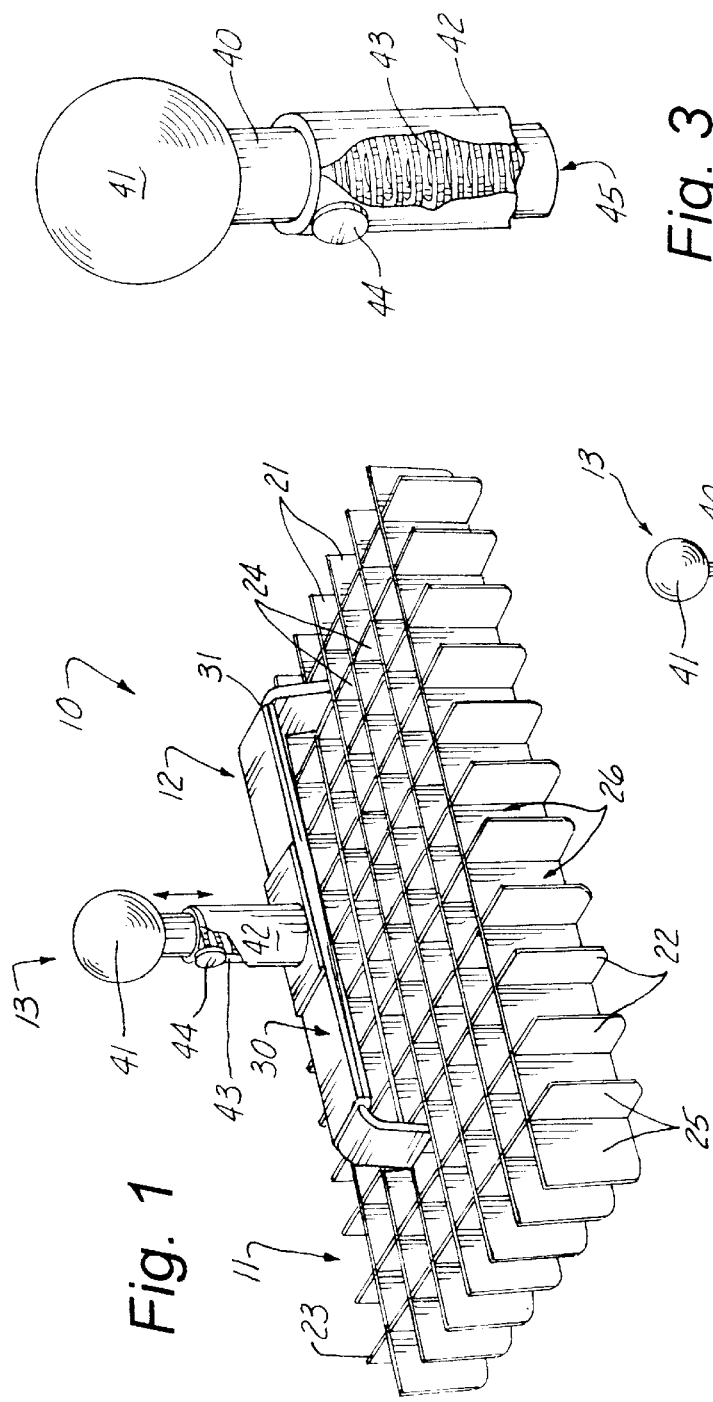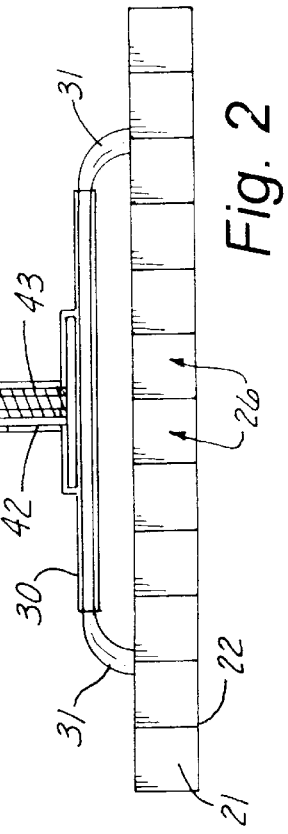

IMPACT ACTUATED BAKERY GRID DEVICE

STATEMENT REGARDING FEDERALLY SPONSORED RESEARCH OR DEVELOPMENT

Not applicable.

CROSS REFERENCE TO RELATED APPLICATIONS

Not applicable.

REFERENCE TO MICROFICHE APPENDIX

Not applicable.

BACKGROUND OF THE INVENTION

1. Field of the Invention

The present invention relates to the field of bakery cutting devices in general, and in particular to multiple segment bakery cutting devices in particular.

2. Description of Related Art

As can be seen by reference to the following U.S. Pat. Nos. 4,250,618; 4,625,404; 5,074,777; and 5,129,159, the prior art is replete with myriad and diverse bakery cutting and/or segmenting devices used to produce uniform size bakery goods.

While all of the aforementioned prior art constructions are more than adequate for the basic purpose and function for which they have been specifically designed, they are uniformly deficient with respect to their failure to provide a simple, efficient, and practical way to make a bakery style grid device that will produce a plurality of bakery goods of uniform size and cleanly defined edges.

As anyone who has employed the prior art grid devices is all too well aware, the removal of the individual bakery goods from within the individual grid pattern openings is often a cumbersome and messy chore producing less than aesthetically pleasing results.

As a consequence of the foregoing situation, there has existed a longstanding need for a new and improved type of bakery grid device that will forcibly separate the bakery goods from the sides of the grid pattern to produce uniform edged bakery goods and the provision of such a construction is a stated objective of the present invention.

BRIEF SUMMARY OF THE INVENTION

Briefly stated, the impact actuated bakery grid device that forms the basis of the present invention comprises a grid unit provided with a handle unit that is operatively associated with a force generating unit for imparting a controlled impact force to the grid unit.

As will be explained in greater detail further on in the specification, the handle unit includes a handle member connected at spaced locations on the grid unit. The force generating unit is centrally disposed on the handle member.

In addition, the force generating unit includes a spring biased rod member slideably disposed within a housing element attached to the handle element. The rod member may be retracted against a spring element and then released such that the bottom of the rod member forms an impact surface that is brought into forcible contact with the handle member which transmits the impact force to the grid unit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the impact actuated bakery grid device that forms the basis of the present invention;

FIG. 2 is a cross-sectional view of the device taken through line 2—2 of FIG. 1; and FIG. 3 is an isolated partial cut-away view of the force transmitting unit of the invention.

DETAILED DESCRIPTION OF THE INVENTION

As can be seen by reference to the drawings, and in particularly to FIG. 1, the impact actuated bakery grid device that forms the basis of the present invention is designated generally by the reference number 10. The grid device 10 comprises in general a grid unit 11, a handle unit 12, and a force transmitting unit 13. These units will now be described in seriatim fashion.

As can be seen by reference to FIGS. 1 and 2, the grid unit 11 comprises a grid member 20 including a plurality of perpendicularly aligned longitudinal 21 and transverse 22 rows of blade elements 23 that are arranged in a grid pattern to define a plurality of identically configured internal compartments 24 and a plurality of identically configured external peripheral panel segments 25 which cooperate with a suitably configured baking pan or the like (not shown) to define similarly configured peripheral compartments 26.

In the preferred embodiment of the invention illustrated in the drawings, the blade elements 23 may be fabricated from stainless steel or Teflon® depending upon whether the grid member 20 is to be primarily employed as a cutting tool after the bakery item has been cooked, or is to be used primarily to segregate the bakery item into individual serving portions during the cooking process.

Still referring to FIGS. 1 and 2, it can be seen that the handle unit 12 comprises a generally inverted U-shaped handle member 30 having a pair of widely spaced downwardly depending arms 31 which are connected along the longitudinal axis of the grid member 20 for reasons that will be explained presently.

Turning now to FIGS. 2 and 3, it can be seen that the force transmitting unit 13 comprises in general, an elongated force transmitting rod member 40 having an enlarged knob element 41 disposed on its upper end. The lower end of the rod member 40 is slideably received in a hollow cylindrical housing element 42 which is centrally disposed on the handle member 30.

In addition, the lower end of the rod member 40 is operatively attached to a spring 43 which is captively received within the housing element 42 such that the rod member 40 may be retracted relative to the housing element 42 against the downward biasing force of the spring 43.

Then once the knob element 41 is released, the bottom 45 of the rod member 40 will forcibly impact the handle member 30 which will transfer the impact force to the perpendicular rows 21, 22 of blades 23 to forcibly separate the blade surfaces 23 from contact with any adhering portion of the baked goods surrounded by the blade surfaces 23.

As can also be seen by reference to FIGS. 2 and 3, the housing element 42 is further provided with a latching element 44 which will releasably engage the spring element 43 to immobilize the rod member 40 relative to the housing element 42 when the rod member 40 is not being used in its force transmitting mode. This arrangement allows the force transmitting unit 13 to act as an extension of the handle unit 12 when not being employed for its primary purpose.

As was previously mentioned, the grid device 10 may be used either subsequent to, or during the baking process. In either event, the force generating unit 13 will forcibly dislodge with the assistance of gravity, any baked goods clinging to the interior surfaces of both the interior compartments 24 and the opposed surfaces of the peripheral compartments 26. This procedure can be accomplished without the need to apply downward pressure on the top surface of the individual serving portions of baked goods that would otherwise be frictionally engaged within the compartments 24 or 26.

In addition, the generally uniform impact force generated by the force generating unit 13 should also result in a clean disengagement of the individual serving portions from each of the compartments 24, 26, such that the serving and/or segregation of the baked goods will produce individual portions of a uniform size and appearance with virtually no particles of foodstuffs clinging to the surfaces of the rows 21 and 22 of blade elements 23.

It should also be noted that when the grid device 10 is in use, the user has the option to selectively disable the force generating unit 13 by use of the latching element 44. When the latching element 44 is engaged, the enlarged knob 41 on the rod member 40 may be used as an extension of the handle member 30 to produce a downwardly directed force on the grid member 20. When the latching element 44 is not operatively engaged, the user can grasp the handle member 30 on opposite sides of the housing element 42 to produce a downwardly directed force on the grid member 20.

Furthermore, the widely spaced contact of the arms 31 of the handle member 30 will insure that the force imparted to the handle member 30 by the force generating unit 13 will be uniformly distributed to the grid member 20.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. An impact actuated bakery grid device for producing uniform size individual serving portions from a baked good item wherein the grid device comprises:

a grid member including a plurality of interacting rows of blade elements defining a plurality of identically configured interior compartments;

a generally inverted U-shaped handle member having a pair of arms that are operatively connected to the grid member at widely spaced locations; and means for transmitting a controlled impact force through said handle member and into said grid member wherein said means comprises a spring biased rod member wherein the bottom of the rod member forms an impact surface for contacting said handle member and the lower portion of the spring biased rod member is movably disposed in a housing element that is centrally disposed on said handle member and further provided with a latching element for releasably engaging said spring biased rod member.

2. The grid device as in claim 1 wherein said plurality of intersecting rows of blade elements are aligned generally perpendicular to one another.

3. The grid device as in claim 2 wherein said grid member is further provided with a plurality of external peripheral panel segments.

4. The grid device as in claim 2 wherein the grid member has a longitudinal axis and the arms of the handle member are connected along the longitudinal axis of the grid member.

5. The grid device as in claim 1 wherein the upper portion of said rod member is provided with an enlarged knob element.

* * * * *